Nov. 14, 1933. G. E. A. HALLETT Re. 18,997
BRAKE CONTROL
Original Filed Aug. 6, 1926
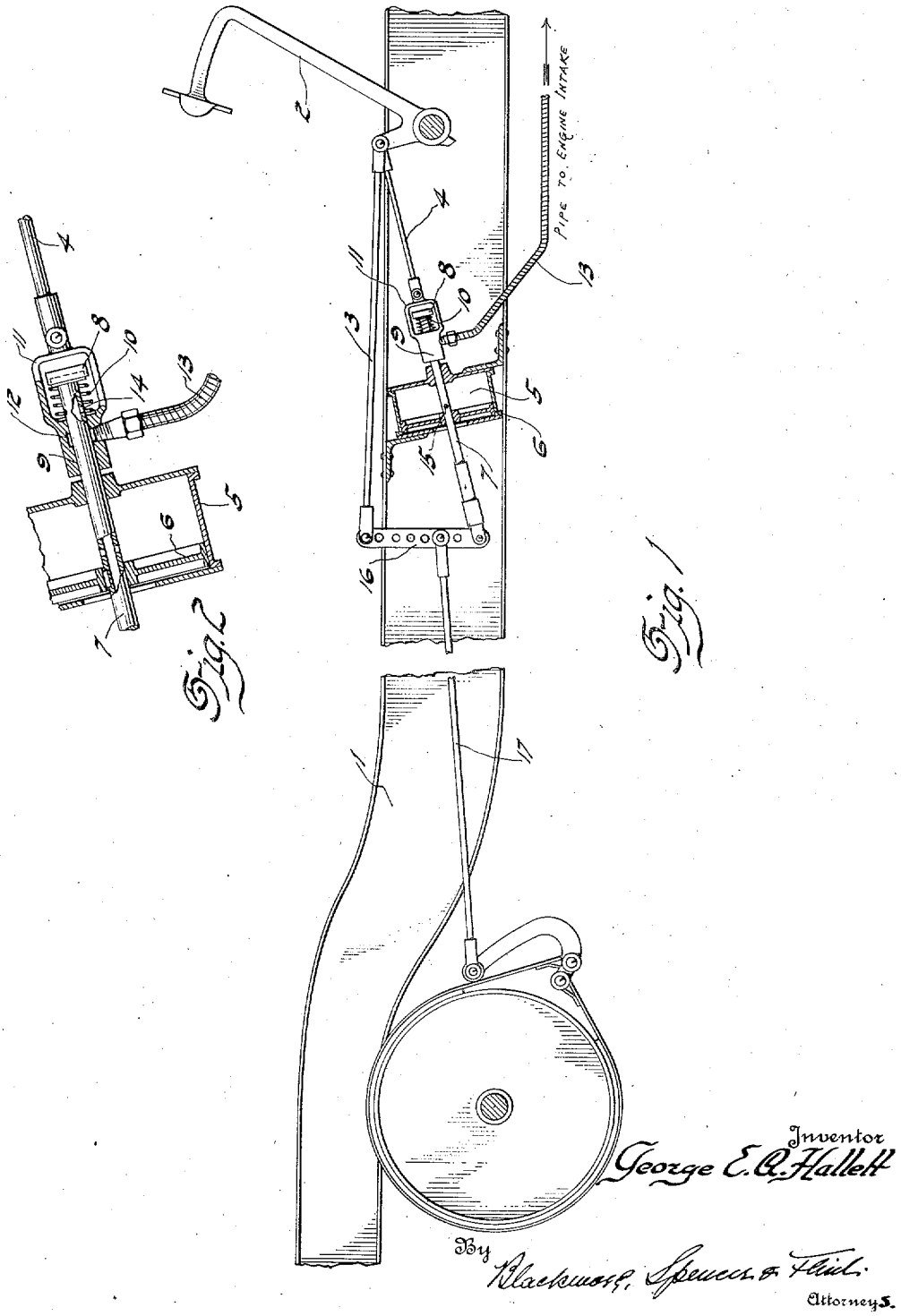
Inventor
George E. A. Hallett
By Blackmore, Spencer & Flint.
Attorneys.

Reissued Nov. 14, 1933

Re. 18,997

UNITED STATES PATENT OFFICE 18,997

BRAKE CONTROL

George E. A. Hallett, Detroit, Mich., assignor to General Motors Research Corporation, Detroit, Mich., a corporation of Delaware Original No. 1,755,989, dated April 22, 1930, Serial No. 127,624, August 6, 1926. Application for reissue April 21, 1932. Serial No. 606,750

18 Claims. (Cl. 188—152)

This invention relates to power brakes, and more particularly to a device which will apprise the operator of the braking effort being applied.

While in the past, there have been a few power brakes devised affording manual pressure control of the braking power, these devices have not gone into general use, due to their impracticability, their complications and great cost of production. One of the primary objects of the present invention is to provide a simple device, which will be economical in construction, of increased strength, automatic in operation, positive in action and unlikely to get out of repair.

A further object of the invention is to provide a power brake which will be operated in accordance to manual pressure, regardless of the position to which the control lever is manipulated.

A further object of the invention is to provide a device by which the operator will be enabled to determine the braking action being exerted, by the pressure required to operate the control lever.

A further object of the invention is to provide a brake system which may be operated by manual effort in event the power energy fails.

With the above and other objects in view, as will appear from the specification, the invention consists of the features of construction, parts and combination thereof as hereinafter described and set forth.

For the purpose of illustration the invention is shown in the drawing and will be described as applied to an automobile, but it is to be understood that it is not limited to such use alone, but may with equal facility be used in other connections, such as on locomotives, marine vessels, aeroplanes, and the like.

In the drawing wherein is shown the preferred, but not necessarily the only embodiment of the invention, Figure 1 is a fragmentary side elevation of an automobile frame, with the present invention applied thereto, and Figure 2 is a sectional view of a form of power unit or brake motor.

Referring to the drawing, 1 represents an automobile frame, and 2 is the foot operated brake control lever. A pair of motion transmitting links or rods comprising the rod 3 and the sectional rod 4—7 are pivotally secured at a common point to the pedal or lever 2 from which they diverge rearwardly to spaced apart points of pivotal connection on the distributor bar or link 16, forming with the distributor bar a triangular outline.

The power to operate the brake may take any one of a number of forms. It may be electric current, pneumatic pressure, or the like.

The unit shown is operated by engine suction and consists of a housing 5 mounted on the frame member 1, having a sliding piston 6 keyed to the power transmission link or rod section 7. At the end of the power rod 7 is an enlarged head 8 with a rubber or leather cushion seating therein. A sleeve 9 slides on the end of the rod 7 and the spring 10 abutting the end of the sleeve and the rubber or leather washer, normally spaces the sleeve and head one from the other. Fingers 11 on the sleeve project beyond the head and are pivoted to the link or rod section 4, and the sleeve and head thus form a flexible or lost motion connection between the sections of the power transmission rod 4—7.

Leading from the engine intake manifold to an annular passageway 12 in the sleeve 9, is a flexible suction pipe line 13. In the normal position of the parts as shown in Figure 2, the rod 7 closes off the passageway 12. However, when the automobile driver wishes to come to a stop and his foot presses down on the lever 2, the rods 3 and 4 are moved forward, and also the sleeve 9 against the tension of the spring 10, so that the sleeve slides on the rod 7 until the hole 14 in the shaft is in line and communicates with the passageway 12. At this point the engine suction, through the hollow rod 7 and hole 15, creates a vacuum in the cylinder of the housing 5. Atmospheric pressure on the back of the piston 6 causes it to be drawn into the cylinder carrying with it the rod 7.

At the end of the rod 7 is pivoted the crossbar or distributor link 16, distributing the pulling effort of the power unit between the brake rod 17 and reaction lever rod 3 in a predetermined ratio. The distributor link is shown with the power rod 7 at its lower end and the reaction rod 3 at its upper end. The brake rod 17 could be placed at any intermediate point according to how it was desired to spread the effort of the power unit. That is, the point of fastening would divide the link into the same proportion as the desired effort on the reaction rod 3 bears to the effort on the brake rod 17.

The closer the pivotal connection of the brake rod to the power rod pivot, the greater will be the power effort exerted on the brake and the less will be the proportional amount exerted on the reaction rod. In practice, it has been found desirable to connect the parts in a six to one ratio, so that only one-sixth of the pull is exerted on the control lever, and the bulk of the pull employed to operate the brake.

The pull of the rod 7 is forward, carrying with it the brake rod 17, but the brake resistance tends to carry the link 16 rearwardly about its lower pivotal connection with the forwardly moving rod 7, and the rod 3 transmits such rearward movement to the control lever 2 in opposition to the manual pressure. If the lever 2 was allowed to be brought back by this movement, the sleeve 9 carried by the lever rod 4 would slide on the rod 7 to its normal position cutting off the suction and the braking effort would cease. However, if the operator did not care to release the brakes, a slight additional foot pressure would be required to overcome the small proportion of the power effort being exerted thru the link 16 and reaction rod 3, and this additional foot pressure must be constantly increased proportionately to the increasing amount of power effort. The additional foot pressure on the lever being dependent on the amount of power effort exerted and the resistance of the brake, the operator therefore, is enabled to "feel" whether the effort is great or slight. The function of the brake is thus proportioned to foot pressure rather than position of the foot pedal.

The construction is such that in case of a partial or total failure of engine suction, or if for any other reason the power unit does not operate, the brake may be operated solely by the application of foot pressure upon the lever. Such foot pressure would be transmitted to the link, after taking up the lost motion between the rods 4 and 7, thru both the rod 3 and the combined rods 4 and 7. In such event, the brake operation would be dependent on position of the lever, as is ordinarily the case in manual brakes.

When pressure is applied to the pedal, or the so-called physically operable member, the parts 3, 16, 7, and 4 may, at first, if there be slack in the system, move as a unit. This movement continues during the time that the slack is being taken up, and during this stage of the operation no actual braking occurs. During this stage the spring 10 remains unchanged, this spring offering more resistance to compression than the resistance required to take up the clearances. Also, during this first stage, the piston 6 moves in a direction away from the bottom of the cylinder. After the slack has been taken up further movement of the pedal is resisted by the engagement of the elements constituting the brake. The depression of the pedal then moves part 9 to the right as before, but its pull upon rod 3 rotates lever 16 about its pivot with link 17 as a fulcrum, thus exerting a pull upon rod 7. The consequent relative movement of parts 7 and 9 of the valve thus closes the air vent and opens the suction conduit. The suction causes piston 6 to move to the right. This serves to rock lever 16 about its pivotal connection with link 3 and applies the brake forcibly. If the pedal continues to be depressed the valve parts may be kept in the same relative position (spring 10 compressed and the suction conduit opened). If, however, the pedal is held immovable after the suction is rendered operable as described, the piston carried valve parts 7, 8 move relative to the pedal part 9. The movement of the parts 7 and 8 obviously continue the application of the brake. However, this movement of the parts 7 and 8 relative to 9 soon effects the closure of the suction conduit. The braking pressure is then balanced against the pressure of spring 10. Complete relief of pedal pressure thereafter permits the spring 10 to restore the valve parts to air venting position. The brakes are then released.

While the structural features have been described more or less specifically, it is to be understood that the invention is not limited to the exact details, but obvious modifications may be employed, without departing from the spirit of the invention as set forth in the appended claims.

Having described the invention, I claim:

1. The combination of a conduit conveying power energy, a head connected with the conduit, a power rod sliding in said head to establish communication with the conduit to permit the application of the power energy for exerting a pulling effort on the power rod, a distributor link connected with the power rod, a brake rod connected to the link to operate a brake, a reaction rod connected to the link, a manual pressure lever to which the reaction rod transmits a portion of the power energy, and a connection between the lever and head tending to close the communication of power energy under the influence of the reaction rod, thereby necessitating a manual pressure on the lever to overcome the power exerted thru the reaction rod to maintain open communication and continued power effort to operate the brake.

2. The combination with a slip connection, consisting of a manually controlled rod, a sleeve carried by the rod, and a power transmission rod having limited sliding engagement with the sleeve, which sliding engagement normally controls the operation of a power unit acting on the rod, of means for manually controlling the first mentioned rod, a link at the end of the power transmission rod, a reaction rod carried by the link and transmitting the movement of the power rod to the manual control means of the first mentioned rod, and a brake rod also carried by the link and transmitting the movement of the power rod to operate the brake, the slip connection permitting manual operation of the brake in case of failure of the power unit.

3. A brake system for vehicles, including a power unit, a power transmission rod formed in sections and carried by the unit, a distributor link connected with one section of the power rod, a brake rod and a reaction rod connected with the link so as to receive the effort of the power unit according to a predetermined ratio, a manual pressure control lever with which said reaction rod and the other section of the power transmission rod are connected, and a lost motion connection between the power transmission rod sections which controls the action of the power unit.

4. A brake system for vehicles including a manual pressure control lever, a pair of rods extending from the manual pressure control lever, one of the rods being formed in sections, and having a lost motion connection between the sections, a power unit of which one of the sections of said sectional rod forms an intimate part, means controlled by said lost motion connection to operate the power unit, a brake rod and means to connect the power unit rod section with the brake rod and the other rod of said pair to distribute the effort of the power unit in predetermined ratio therebetween for applying the brake and proportionally resisting manual pressure on the control lever.

5. A brake system for vehicles including a manual pressure control lever, a pair of rods pivotally connected at a common point on the manual pressure control lever and extending divergently therefrom, a cross bar pivotally connected with and extending between the ends of said rods forming a triangular outline, a brake rod connected with said cross bar intermediate the connections of said rods, one of said divergently extending rods being formed in sections, a power unit of which one of said sections forms a part, and a slip joint between the sections controlling the action of the power unit.

6. A brake system for vehicles including a distributor bar, a pedal, two links extending from a common point on the pedal to opposite ends of said bar, brake linkage connected with the bar intermediate its ends, and a power unit adapted to act on one of said links.

7. The structure of claim 6, the link on which the power unit acts being formed in sections and having a lost motion connection which controls the operation of said power unit.

8. The structure of claim 6, the link on which the power unit acts being formed in sections, one of which is hollow forming a conduit which communicates with the power unit, a sleeve having sliding engagement on the end of said section and being carried on the end of the other of said sections, a conduit for power energy associated with said sleeve and adapted to be brought into and out of communication with an opening leading to the interior of said hollow section upon movement of said sleeve to control the action of the power unit.

9. A brake system for vehicles including a pedal, a rod extending therefrom and being formed in sections with a slip joint therebetween, a power unit associated with one of the sections and controlled by said slip joint, a distributor bar having a pivotal connection at one end with the power unit rod section, a reaction rod pivotally connected at its opposite ends respectively with the pedal and with the other end of said distributor bar, and brake linkage pivotally connected with the distributor bar intermediate the ends of the bar.

10. In a brake system for automotive vehicles, the combination with a brake mechanism, a power actuator operated by differentials of fluid pressure and operatively connected with said brake mechanism, a physically operable member, and a controlling valve mechanism for the actuator comprising a plurality of working parts, said parts being independently movable with respect to said brake mechanism during the power operation thereof, of a floating lever operatively connected with said brake mechanism, with the physically operable member and with said valve mechanism.

11. In a brake system for automotive vehicles comprising, in combination, a brake mechanism, a power actuator operatively connected with said brake mechanism, a physically operable member and means interconnecting said latter member and the brake mechanism, said means comprising a floating lever member, a valve mechanism comprising a plurality of working parts and operable by the relative movement of two of its parts, and connections interconnecting said two parts of the valve mechanism, said physically operable member and said floating lever, said connections being such as to effect a simultaneous movement of both of the aforementioned parts of the valve mechanism responsive to actuation of the physically operable member to render the power actuator operable to operate the brakes and to further effect a movement of but one part of the valve under the action of the power actuator when the position of the physically operable member is maintained, to thereby effect a predetermined power loading of the brakes.

12. A power brake system for automotive vehicles comprising, in combination, a brake mechanism, a manually operable member therefor, a power actuator operatively connected with said brake mechanism, a valve mechanism for controlling said power actuator comprising a plurality of working parts, said valve mechanism being operable by the relative movement of its parts, and means interconnecting said manually operable member and said brake mechanism, said means comprising said valve mechanism and further comprising a lever interconnecting the operable parts of the valve member.

13. A power brake system for automotive vehicles comprising, in combination, a brake mechanism, a manually operable member therefor, a power actuator operatively connected with said brake mechanism, a valve mechanism for controlling said power actuator, said valve mechanism comprising a plurality of working parts and being operable by the relative movement of its parts, and means interconnecting said manually operable member and said brake mechanism, said means comprising said valve mechanism and further comprising a lever interconnecting the operable parts of the valve member, and yielding means tending to move said lever and said parts of the valve mechanism in a direction to effect the release of the brakes.

14. A power brake system for automotive vehicles comprising, in combination, a brake mechanism, a manually operable member therefor, a power actuator operatively connected with said brake mechanism, a valve mechanism for controlling said power actuator, said valve mechanism comprising a plurality of working parts and being operable by the relative movement of its parts, and means interconnecting said manually operable member and said brake mechanism, said means comprising said valve mechanism and further comprising a lever interconnecting the operable parts of the valve member, said lever being so constructed as to insure the relative movement of said valve parts, with movement of said manually operated lever and with corresponding movement of said power actuator.

15. A power brake sytem for automotive vehicles comprising, in combination, a brake mechanism, a manually operable member therefor, linkage including two relatively movable parts, said linkage interconnecting said brake mechanism and manually operable member, a power actuator operatively connected with said brake mechanism, a valve mechanism for controlling said power actuator comprising a plurality of working parts, said parts being operatively connected with two relatively movable parts of the aforementioned linkage, one of said latter parts comprising a lever connected with the brake mechanism, with the the valve mechanism and with the manually operable manner.

16. A brake system for automotive vehicles comprising, in combination, a brake mechanism, a power actuator operatively connected with said brake mechanism, and a physically operable member, means interconnecting said brake mechanism and said physically operable member, said means including a floating lever connected to said brake mechanism and further including a valve mechanism for controlling the operation of the power actuator, said valve mechanism comprising a plurality of working parts, yielding means tending to hold the parts of the valve mechanism in the released position, the parts of said valve being so interconnected with the physically operable member and with the floating lever as to insure simultaneous movement of all parts of said valve mechanism with the operation of the physically operable member whereby said power actuator may operate the brake mechanism by power.

17. A brake system for automotive vehicles comprising, in combination, a brake mechanism, a power actuator operatively connected with said brake mechanism, and a physically operable member, means interconnecting said brake mechanism and said physically operable member, said means including a floating lever connected to said brake mechanism and further including a valve mechanism for controlling the operation of the power actuator, said valve comprising a plurality of working parts, yielding means tending to hold the parts of the valve mechanism in the released position, the parts of said valve being so interconnected with the physically operable member and with the floating lever as to insure simultaneous movement of all parts of said valve mechanism with the operation of the physically operable member to render said power actuator operable to operate the brakes, said aforementioned lever being connected at one of its ends with said manually operable member, at the other end with the valve mechanism and connected intermediate said points of connection with the brake mechanism.

18. A manually operable member, a floating lever, brake mechanism, a connection between the brake mechanism and an intermediate portion of the lever, a power cylinder, valve mechanism to control the power cylinder, said valve mechanism having a plurality of relatively movable parts, means connecting said manually operable member at one end of said lever and to one of said movable parts, means connecting the other end of the lever to the other of said movable parts.

GEORGE E. A. HALLETT.